Patented Jan. 5, 1926.

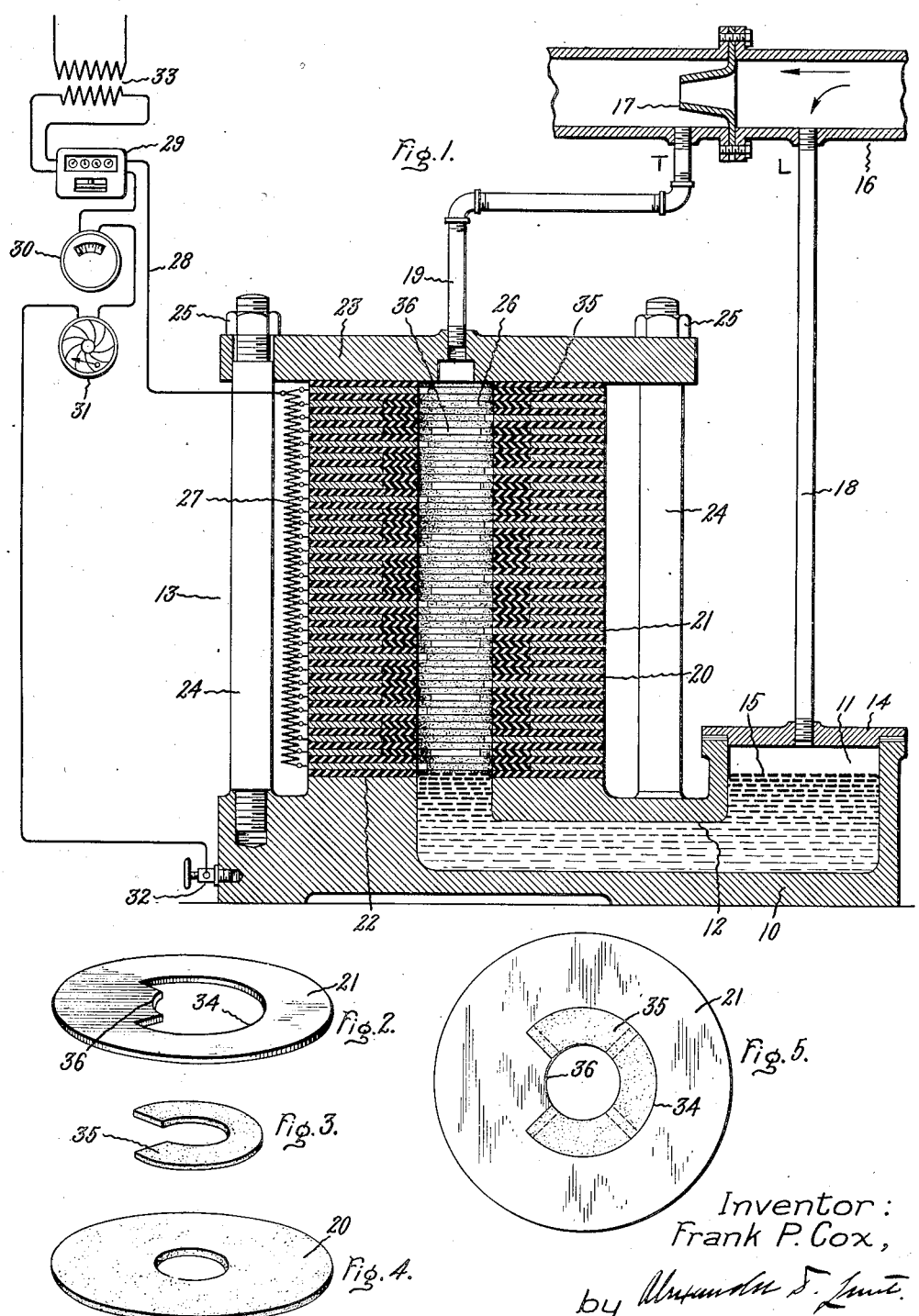

1,568,724

UNITED STATES PATENT OFFICE.

FRANK P. COX, OF LYNN, MASSACHUSETTS, ASSIGNOR TO GENERAL ELECTRIC COMPANY, A CORPORATION OF NEW YORK.

PRESSURE-RESPONSIVE INSTRUMENT FOR FLOW METERS AND THE LIKE.

Application filed March 3, 1923. Serial No. 622,688.

*To all whom it may concern:*

Be it known that I, FRANK P. COX, a citizen of the United States, residing at Lynn, county of Essex, State of Massachusetts, have invented certain new and useful Improvements in Pressure-Responsive Instruments for Flow Meters and the like, of which the following is a specification.

The present invention relates to instruments which are responsive to pressure or pressure difference and are used to indicate, indicate and record, or indicate, record and integrate a pressure or pressure difference either in terms of pressure or pressure difference or in terms of some quantity which is a function of or bears a different relation to a pressure or a pressure difference. It relates more particularly to instruments of the electrical resistance type wherein the pressure to be measured moves a column of liquid which in turn functions to increase and decrease the electrical resistances in an indicating circuit. One use of my invention is in connection with flow meters for measuring the flow of fluid in conduits and it is this use which I have chosen to illustrate and describe in this application. It will be understood, however, that my invention is not necessarily limited to this particular use.

The object of my invention is to provide an improved construction and arrangement in an instrument of this character, and for a consideration of what I believe to be novel and my invention, attention is directed to the following description and the claims appended thereto.

In the drawing, Fig. 1 is a sectional view of an instrument embodying my invention; Figs. 2, 3 and 4 are perspective views of elements used in building up one leg of the instrument, and Fig. 5 is top plan view of one leg with the top plate removed.

Referring to the drawing, 10 indicates a base containing a well 11 which forms one leg of a U-tube and a passage 12 which connects well 11 with the other leg of the U-tube which is indicated generally by the reference numeral 13. Well 11 is closed at the top by a suitable cover plate 14. In well 11 is a quantity of indicating liquid 15 such as mercury. 16 indicates a conduit through which the fluid to be measured flows. Arranged in conduit 16 is a pressure difference creating device which creates a pressure difference which bears a definite relation to the rate of flow through the conduit. Any suitable form of pressure difference creating device such as a Pitot tube, a Venturi tube or the like may be used, there being illustrated in the present instance a device of a known type usually termed a flow nozzle. The leading pressure pipe 18 is connected to well 11 and the trailing pressure pipe 19 is connected to leg 13. This forms a usual type of flow meter connection the operation of which is well understood. At zero flow the liquid 15 stands at the same level in both legs of the U-tube. When flow takes place in conduit 16 there is created by device 17 a pressure difference which causes the liquid in well 11 to be lowered and that in leg 13 to be raised, the deflection of the liquid being proportional to the rate of flow.

My invention relates more particularly to the construction of the leg 13 of the U-tube, and according thereto I form the leg 13 of a series of alternate insulating disks 20 and conducting disks 21. These are stacked one on top of another, the lowermost disk resting on a flat surface 22 formed on base 10. On top of the stack of disks is a top plate 23 held in place by a series of posts 24. By screwing down the nuts 25 on the upper ends of posts 24, the disks 20 and 21 are squeezed down tightly together to form in substance a solid leak-proof structure which provides a vertical chamber 26. Trailing pressure pipe 19 communicates with chamber 26 through an opening in the top plate 23. Outside leg 13 is an electrical resistance 27 which is connected at spaced intervals to conducting disks 21. The resistance located between each pair of adjacent disks 21 may have any suitable value in accordance with the use to which the instrument is to be put. If they have equal value, then equal increments in the rise of mercury in chamber 26 will cause equal changes in the rate of flow of current through the electrical resistance. In the case of a flow meter where it is desired to integrate the flow by means of a watthour meter, the resistance between the respective disks 21 must gradually decrease in amount from the lower end to the upper end of the leg since as is well known the pressure difference created by a pressure difference creating device varies with the square of the flow through the conduit.

Connected to resistance 27 is an electrical circuit 28 which includes measuring instruments in the form of a watthour meter 29, and indicating ammeter 30 and a curved drawing ammeter 31. Circuit 28 is connected on one side to the upper end of resistance 27, the other side being grounded on base 10 as indicated at 32. Circuit 28 may be connected with any suitable source of electrical potential, a transformer 33 being indicated in the present instance. In the present instance it is intended that the resistances between disks 21 are of such values that changes in current flow in the circuit will be directly proportional to the changes in the flow of fluid being metered.

It is usually desirable that the distance from one disk 21 to the next disk 21 be small in order to make the instrument sensitive to slight deflection of the mercury. This means, of course, that the insulating disks 20 are comparatively thin and unless care is exercised difficulty may be met with due to adjacent disks becoming connected to each other during the construction of the device, or subsequently connected. To avoid this disks 21 may with advantage be provided with arcuate cut away portions 34 which are filled in with insulating members 35 as shown in Fig. 3 so that each disk 21 presents only a short length 36 to the surface of well or chamber 26. The short length 36 of successive disks 21 are then staggered around well or chamber 26 relatively to each other. This serves to increase the distance between the portions of disks 21 exposed for contact with the liquid column in leg 13.

At zero flow the level of liquid in leg 13 stands just below the lowermost disk 21 so that the indicating circuit is open and the measuring instruments read zero. Now when flow takes place through circuit 16, the pressure difference creating device will create a pressure difference which will effect a lowering of the level of liquid in well 11 and a rising of the level in leg 13. As soon as the liquid engages the exposed surface of the lowermost disk 21, the circuit is closed through the total resistance 27, and then as the liquid continues to rise resistance will be cut from the circuit step by step as the liquid engages successive disks 21. The flow of current in the circuit will thus increase with the rise of the liquid in leg 13. The measuring instruments may be calibrated to read directly in terms of flow of fluid through conduit 16, or in suitable terms which may be converted into terms of such flow.

With the above described arrangement the electrical resistance is arranged entirely outside the instrument where it is readily accessible for adjustment and where it is not exposed to action of the indicating liquid or to high temperatures or pressures such as are met with, for example, in metering high pressure steam. Disks 21 can be arranged to expose a large surface for contact with the liquid so that good electrical connection between the conducting liquid and the disks is obtained. In addition, the arrangement is simple in structure, easy to manufacture, and can be readily made pressure tight.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. A device of the character described, comprising a wall which defines a chamber, and a conducting liquid in the chamber, at least a portion of said wall comprising a plurality of conducting and non-conducting elements stacked one on another, said elements having inner and outer edges, only a portion of the inner edges of the conducting elements being exposed to the inner surface of said wall, and such exposed portions being staggered relatively to each other.

2. A device of the character described, comprising a chamber adapted to contain a conducting liquid, said chamber having a wall formed of a stack of conducting and non-conducting annular disks, a portion only of the inner edge of each conducting disk being exposed at the inner surface of said wall, and the exposed portions of successive conducting disks being staggered relatively to each other.

3. In a device of the character described, the combination of a base, conducting and non-conducting annular disks stacked on said base to form a chamber adapted to contain a conducting liquid, said conducting disks being provided with segmental recesses at their inner edges, and filler members of insulating material located in said recesses, the projections remaining as a result of the segmental recesses being staggered relatively to each other.

In witness whereof, I have hereunto set my hand this 27 day of February, 1923.

FRANK P. COX.